(No Model.) 3 Sheets—Sheet 1.
H. LANEY.
PHOTOGRAPHIC CAMERA.

No. 417,871. Patented Dec. 24, 1889.

WITNESSES:
Fred J. Dieterich
Edw. U. Byrn

INVENTOR
Henry Laney.
BY Munn & Co
ATTORNEY (No Model.) 3 Sheets—Sheet 2.

H. LANEY.
PHOTOGRAPHIC CAMERA.

No. 417,871. Patented Dec. 24, 1889.

WITNESSES.
Fred G. Dieterich
Edw. U. Byrn

INVENTOR
Henry Laney
BY Munn & Co
ATTORNEY (No Model.) 3 Sheets—Sheet 3.
H. LANEY.
PHOTOGRAPHIC CAMERA.
No. 417,871. Patented Dec. 24, 1889.
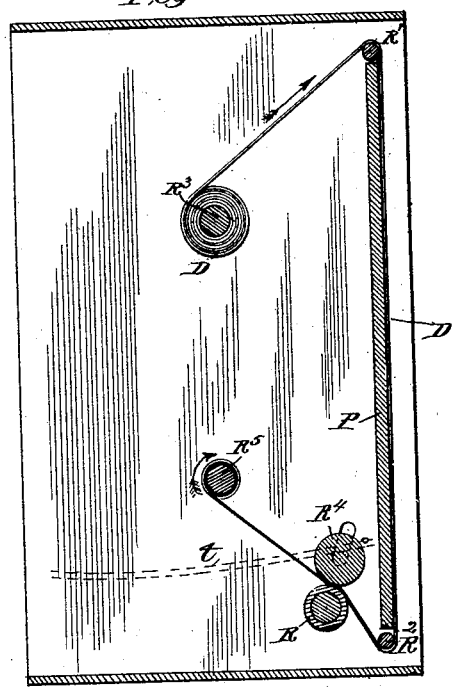
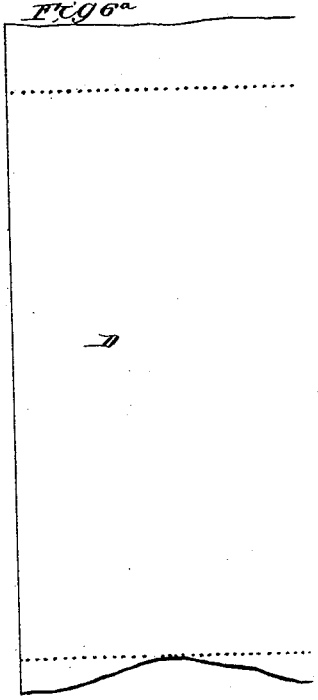
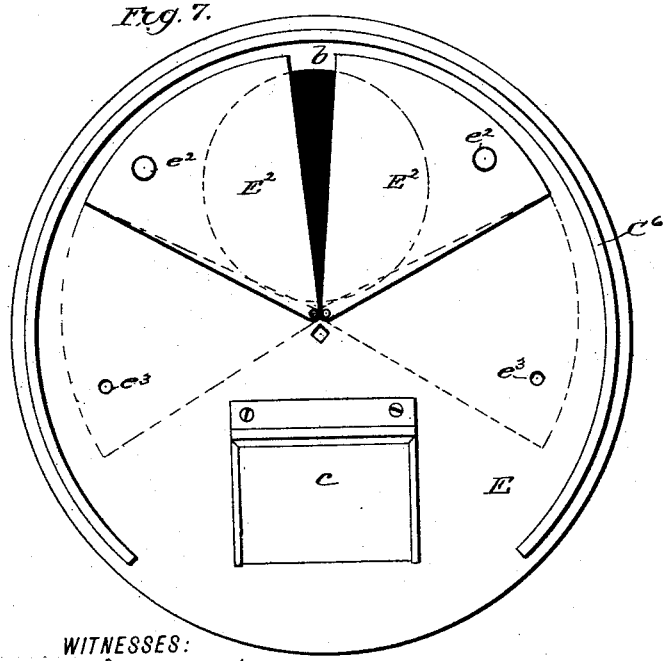
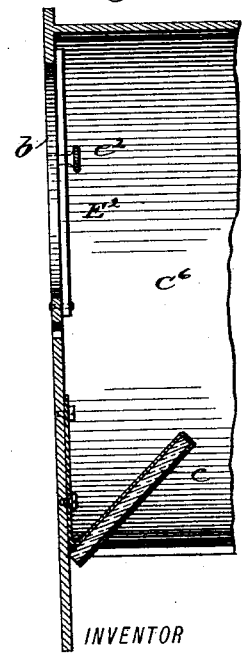
WITNESSES:
Fred G. Dieterich
Edw. U. Byrn
INVENTOR
Hervy Laney
BY Mann & Co.
ATTORNEY

UNITED STATES PATENT OFFICE.

HERVY LANEY, OF CUMBERLAND, MARYLAND.

PHOTOGRAPHIC CAMERA.

SPECIFICATION forming part of Letters Patent No. 417,871, dated December 24, 1889.

Application filed March 25, 1889. Serial No. 304,577. (No model.)

*To all whom it may concern:*

Be it known that I, HERVY LANEY, of Cumberland, in the county of Alleghany and State of Maryland, have invented a new and useful Improvement in Photographic Cameras, of which the following is a specification.

My invention relates to photographic cameras, and especially that class of cameras which are used for taking instantaneous pictures, and in which the shutter is actuated by a spring mechanism with a rotary motion, and is held in check by a stop device which, when operated by the hand, alternately opens and closes the aperture.
My invention is more particularly designed for that class of cameras intended for field use for taking a large number of instantaneous views in succession without removing the negatives from the camera, which negatives are formed on a continuous roll of sensitized paper.

The invention consists, mainly, in providing the shutter with a mirror so disposed on the shutter as to receive the image from the lenses in the tube and project it at right angles upon a field of ground glass or other transparent material, this mirror being so disposed with reference to the aperture in the shutter that as the shutter revolves the aperture coincides with the window of the camera and transmits the image to the sensitized plate or roll, and in the position of rest the aperture is thrown out of coincidence with the window and the light is excluded from the plate while the mirror is brought into position to receive the image and project it at right angles to the tube upon a field of ground glass for inspection, by which arrangement the focusing of the object may be made visible to the operator in this class of automatic cameras.

Figure 1:
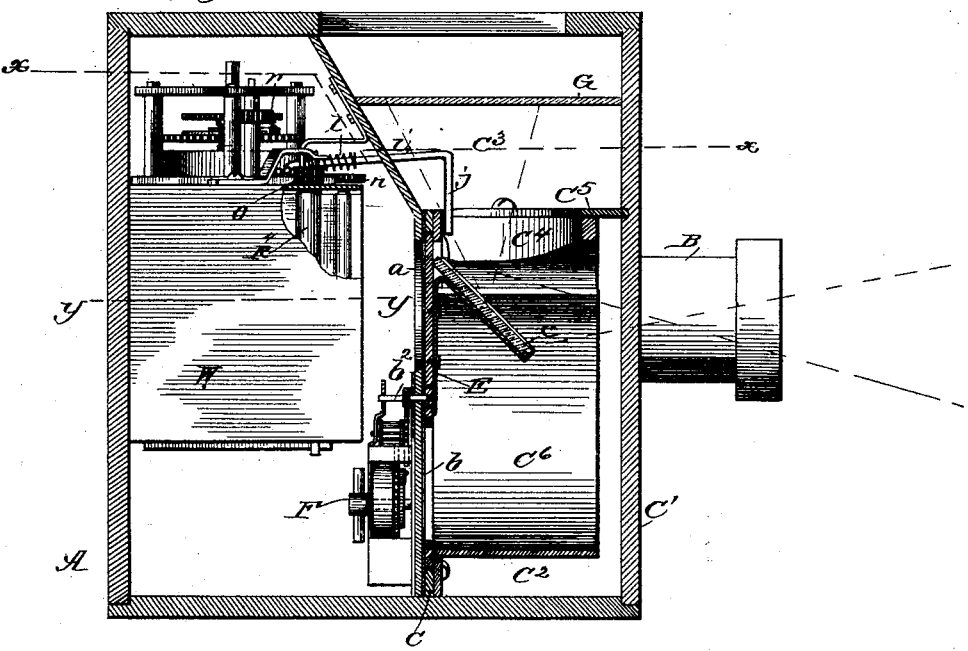
Figure 2:
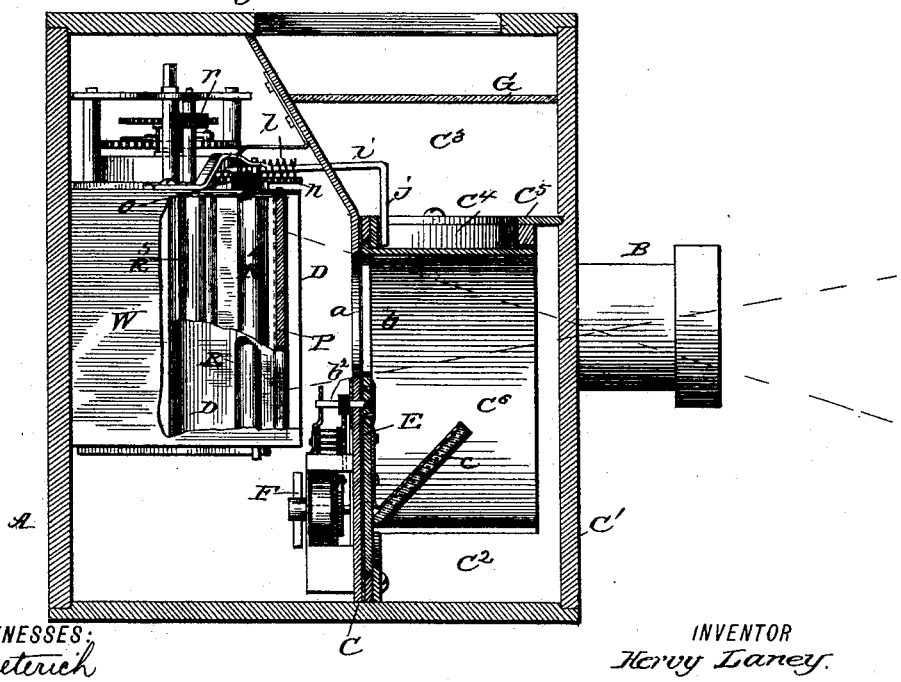
Figure 3:
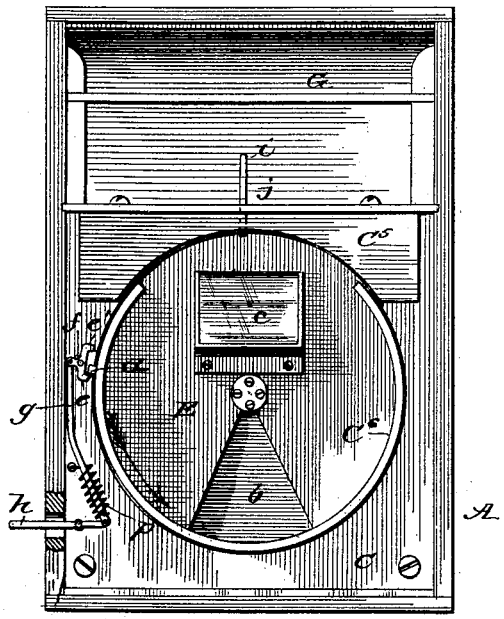
Figure 4:
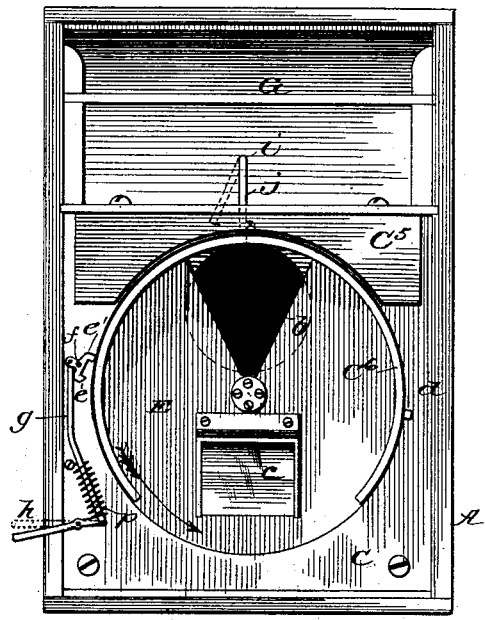
Figure 5:
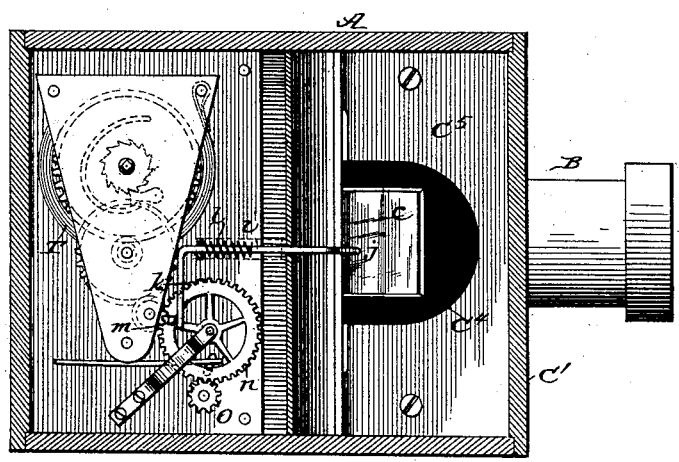

Figure 1 is a vertical longitudinal section showing the position of the parts for deflecting the image laterally. Fig. 2 is a similar view with parts broken away, showing the position of the parts when in position for taking the picture. Fig. 3 is a front view of the camera with the tube and front part of the casing removed, the position of the parts being the same as shown in Fig. 1. Fig. 4 is a similar view, the position of the parts being the same as shown in Fig. 2. Fig. 5 is a horizontal section taken through line $x\ x$ of Fig. 1. Fig. 6 is an enlarged horizontal section of the roll-box on line $y\ y$ of Fig. 1. Fig. $6^a$ is a face view of the perforated sensitized sheet. Figs. 7 and 8 are respectively a face and sectional view of a modification of the shutter.

In the drawings, A represents the case or box of the camera.
B is the tube in which are contained the lenses.

C is a partition in which is formed a window $a$ of circular shape, through which the image from the lens is projected against the sensitized roll within. This sensitized roll is constructed in the form of a sheet D of paper, perforated transversely at suitable intervals (see Fig. $6^a$) to form separate negatives, and wound around rollers arranged vertically and provided with mechanism for giving it a progressive intermittent motion, as will be hereinafter described.

E is the shutter, which is made in disk shape and is fixed to a short shaft $b^2$, that extends through a bearing in the partition C, and is rotated by a spur-gear and spring, as shown at F, which may be of any ordinary construction, such as is used in clocks. This shutter is kept from revolving constantly by a stop mechanism, hereinafter described, which is so arranged as to stop the disk-shaped shutter at every revolution. Upon one side of the axis of this shutter is formed the aperture $b$, adapted to coincide with the window $a$ when turned over the same. Upon the opposite side of the center from the aperture there is mounted upon the shutter a mirror $c$, set at an angle of about forty-five degrees to the plane of the shutter and the same distance from the center as the aperture.

Between the partition C and the outer wall $C'$ there is a chamber $C^2$, which, through an opening $C^4$ in a partition $C^5$, communicates with a diverging chamber $C^3$ above, which at the top is covered by a field-surface G, of ground glass or other similar substance, against which a photographic image may be projected. Now, whenever the shutter E is turned and its aperture $b$ passes over the window $a$, as in Figs. 2 and 4, the image from the lens is projected through the window upon the sensitized roll. When, however, the shutter comes to a rest by the stop mechanism, the mirror $c$ is in the position directly between the lenses and the window, as in Figs. 1 and 3, and the image is received upon the mirror and thrown up at right angles upon the field G of ground glass. The operator is thus enabled to observe on this field the object to be photographed before taking the "shot" at it with the camera, and by this means he is enabled to properly focus his pictures.

To prevent the light from shining down through this glass field and the opening $C^4$ while the photograph is being taken, the revolving disk is provided with a cuff $C^6$, projecting at right angles from the disk and extending all around the disk, except at the point where the mirror is placed. This cuff forms a cut-off for the light shining through hole $C^4$ during the revolution of the disk, and thus preserves the darkness of the camera during the period that the picture is being taken.

For stopping the disk-shutter when rotated by the spring mechanism F, a pin $d$, Figs. 3 and 4, is fixed to the shutter at its periphery, and is caught by a two-pronged escapement-lever $e$ $e'$, which is fulcrumed at $f$ and connected to a rod $g$, which in turn is attached to one end of lever $h$. Around the rod $g$ is wound a spiral spring $p$, which tends to force it down. Now, when this rod is forced down by the spring, the lug $e$ of the escapement holds the pin $d$ of the shutter and keeps it from revolving, as in Figs. 1 and 3, and the mirror in this position reflects the image upwardly against the field G. As soon as the object appears upon the field in proper focus the lever $h$ is worked so as to raise rod $g$, as in Fig. 4, and lug $e$ of the escapement is pulled out and $e'$ forced in. The result is, that the shutter, responding to the influence of the motor mechanism, revolves, and the passage of the aperture $b$ over the window takes an instantaneous effect upon the sensitized roll within. When the pin $d$ has nearly completed its revolution, it is stopped by the lug $e'$ of the escapement-lever, and when the lever $h$ is released the spring shifts the position of the parts $e'$ and $e$, pulling $e'$ out and forcing $e$ in, which causes the pin $d$ to be transferred from $e'$ to $e$, ready for the next picture.

In order to effect the automatic feed of the sensitized paper after an impression has been taken on one of its sections divided by the perforations, the pin $d$ of the revolving shutter is made in its flight to set into action a paper feeding and measuring device, as follows: A rock-shaft $i$ is provided with a bent arm $j$, that comes down to a position to be struck and deflected by the flight of pin $d$ in its revolution. (See Fig. 4.) This rock-shaft passes through the partition that divides the diverging chamber from the roll-chamber, and at its end in the roll-chamber is bent into another arm $k$, (see Fig. 5,) that is normally held down by a spring $l$, to form a stop to a lug $m$ on a toothed wheel $n$. When, however, the pin $d$ of the revolving shutter rocks the rock-shaft, it raises the arm $k$ against the tension of the spring $l$ and allows the toothed wheel $n$ to make one revolution, and thus give a number of revolutions to a smaller toothed wheel $o$. This smaller toothed wheel $o$ is rigidly fixed upon a vertical roller R, journaled in the roll-case W, and this roller R is the measuring-roller over which the roll of sensitized paper is made to pass, and the definite number of revolutions of which roller is made to transfer exactly the amount of paper contained between the rows of perforations across the sheet.

$R'$ $R^2$, Fig. 6, are the two distending-rollers, which stretch the paper across the field of the camera, and which paper between these rollers is held flat in the true focal plane by a back plate P. To the tension-rollers $R'$ the paper passes from a loose or passively revolving supply-roller $R^3$, and from the tension-roller $R^2$ it passes over the measuring-roller R and between it and a friction-roller $R^4$, which is pressed against the measuring-roller by springs $t$ at the top and bottom, which bear against its journals. As the paper emerges from between the measuring-roller and the brake or friction roller it passes to the take-up roller $R^5$, which winds up the paper after the photographic impression is taken thereon. This take-up roller extends through the top of the roll-case, (see Fig. 2,) and is provided with a small gear-wheel $r$, that is the last of a train of gear-wheels actuated by a strong coil-spring T, which thus forms a motor mechanism for winding up the paper on the take-up roller, pulling the paper off the supply-roller and in front of the focusing back plate. It will thus be seen that whenever the revolving shutter trips in its flight the rock-shaft and releases the measuring-roller the take-up roller pulls a measured quantity of paper across the focus-plate. At all other times the measuring-roll is locked and the paper is held stationary against the influence of the take-up roller.

As a modification of my shutter (see Figs. 7 and 8) I may make the opening $b$ in the same so that it may show the full round hole registering with window $a$ for stationary work, or it may be reduced to any desired extent for instantaneous work. For this purpose segmental slides $F^2$ are pivoted to the shutter so as to close over the opening, and are adjusted to place by set-screws $e^2$ and holes $e^3$.

Having thus described my invention, what I claim as new is—

1. The combination, in an automatic camera, of a take-up roller for the sensitized paper and means for rotating it, a pair of measuring-rollers, through which a limited amount of paper is drawn by the take-up roller, a movable shutter, and a locking and tripping mechanism for the measuring-roller, connected to and operated by the movable shutter of the camera, as described.

2. The combination, in an automatic camera, of a take-up roller for the sensitized paper and means for rotating it, a pair of measuring-rollers, through which a limited amount of paper is drawn by the take-up roller, a revolving shutter bearing an angularly-arranged reflector, a focusing-field arranged laterally to receive the image diverted by the reflector, and a locking and tripping mechanism for the measuring-roller, connected to and operated by the revolving shutter, substantially as shown and described.

HERVY LANEY.

Witnesses:
 D. ANNUN,
 F. M. OFFUTT.